United States Patent [19]

Yagi et al.

[11] E Re. 30,844

[45] Reissued Jan. 12, 1982

[54] RUN-ON PREVENTION DEVICE FOR INTERNAL COMBUSTION ENGINES

[75] Inventors: Shizuo Yagi, Asaka; Minoru Atsumi, Kawagoe, both of Japan

[73] Assignee: Honda Giken Kogyo Kabushiki Kaisha, Tokyo, Japan

[21] Appl. No.: 631,657

[22] Filed: Nov. 13, 1975

Related U.S. Patent Documents

Reissue of:

[64] Patent No.: 3,805,760
Issued: Apr. 23, 1974
Appl. No.: 309,745
Filed: Nov. 27, 1972

[51] Int. Cl.[3] ..... F02B 77/00
[52] U.S. Cl. ..... 123/198 DB; 123/396
[58] Field of Search ..... 123/198 DB, 198 R, 97 R, 123/DIG. 11, 103 R, 103 E

[56] References Cited

U.S. PATENT DOCUMENTS

| | | | |
|---|---|---|---|
| 2,692,651 | 10/1954 | Ball | 123/103 |
| 3,158,144 | 11/1964 | Walker | 123/198 DC |
| 3,354,877 | 11/1967 | Zub et al. | 123/DIG. 11 UX |
| 3,491,737 | 1/1970 | Burnia | 123/DIG. 11 X |
| 3,618,581 | 11/1971 | Simonet | 123/198 DB |
| 3,618,582 | 11/1971 | Gerlitz et al. | 123/DIG. 11 |
| 3,678,911 | 7/1972 | Soubis | 123/198 DC X |
| 3,682,148 | 8/1972 | Harrison | 123/198 DB |
| 3,730,153 | 5/1973 | Harrison et al. | 123/103 R |
| 3,744,470 | 7/1973 | Clark | 123/198 DB |
| 3,744,471 | 7/1973 | Braun | 123/198 DB |
| 3,752,141 | 8/1973 | Charron et al. | 123/198 DB |
| 3,752,450 | 8/1973 | Charron et al. | 123/DIG. 11 X |
| 3,753,427 | 8/1973 | Cedar | 123/119 R X |
| 3,847,131 | 11/1974 | Hisatomi | 123/198 DB |

*Primary Examiner*—Ronald H. Lazarus
*Attorney, Agent, or Firm*—Lyon & Lyon

[57] ABSTRACT

A device which prevents run-on continued operation of an internal combustion engine when the ignition is shut off: the device including means for preventing delayed closing of the throttle valve or valves when the ignition circuit is opened.

9 Claims, 3 Drawing Figures

RUN-ON PREVENTION DEVICE FOR INTERNAL COMBUSTION ENGINES

Matter enclosed in heavy brackets [ ] appears in the original patent but forms no part of this reissue specification; matter printed in italics indicates the additions made by reissue.

Internal combustion engines of the spark ignition type may continue to operate after the ignition is turned off. This condition is known as "run-on." This is due to the presence of a hot spot existing in the combustion chamber of sufficient intensity to ignite the fuel mixture even though the electrical ignition through the spark plug is not activated.

Reference is directed to the following copending applications Yagi et al., filed Nov. 27, 1972, Ser. No. 309,744, for CARBURETOR; and Date et al., filed Sept. 22, 1972, Ser. No. 291,254, entitled "Reduction of $NO_x$, HC and CO in the Exhaust Gases of Internal Combustion Engines."

The present invention is directed to a run-on preventing device which is particularly directed to use in conjunction with the internal combustion engines utilizing features of the aforementioned patent applications; however, the present invention is not limited to such use. The present invention is summarized in the following objects:

First, to provide an anti-run-on device which insures complete shut-off of fuel supply simultaneous with opening of the ignition circuit without interfering with the normal function of other devices designed to control operation of an internal combustion engine so as to minimize unwanted emissions.

Second, to provide an anti-run-on device which utilizes a solenoid controlled valve operable in conjunction with a dash pot device to cause instant closure of the throttle valve when the ignition switch is opened.

Third, to provide an anti-run-on device which may be employed in internal combustion engine control systems having more than one fuel supply means, which device effects instant closure of all fuel supply means.

Figure 1:
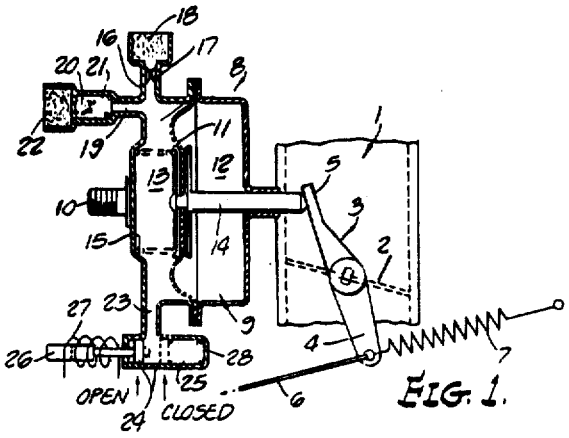
FIG. 1 is essentially diagrammatic fragmentary view showing a portion of an air intake passage for an internal combustion engine downstream from the venturi portion thereof and indicating a throttle valve and a control lever, the control lever being engaged by a pin protruding from a control device which includes a diaphragm and means for ingress or egress of air including a solenoid controlled valve.

Referring first to FIG. 1, a portion of an air inlet duct 1 downstream from the venturi passage is shown. A throttle valve 2 is mounted therein and is shown in its closed position. Attached to the throttle valve by means of a stem protruding from the duct 1 is a control lever 3. For the purposes of illustration, the control lever is shown as comprising opposing arms 4 and 5, the arm 4 being connected to a line 6 actuated by an accelerator pedal (not shown), and also connected to an opposing spring 7. The spring urges the throttle valve toward its closed position.

Mounted at one side of the air duct is a control unit 8 or pneumatic dampener which includes a housing 9 having a stud 10 or other mounting means to place the housing at one side of the air duct 1. The housing is provided with a diaphragm 11 dividing the housing into a vented chamber 12 and a control chamber 13. An operating pin 14 extends from the diaphragm through the vented chamber 12 into engagement with the arm 5 of the control lever 3 when the throttle valve 2 is within a predetermined proximity to its closed position. A spring 15 within the control chamber 13 urges the pin 14 toward the control lever.

Air is permitted to enter or leave the control chamber through several devices. One of the devices includes a venting passage 16 having a restriction 17 and capped by a filter 18. Another includes a passage 19 having a check valve 20 backed by a spring 21 to permit entrance of air to the passage 19, but to close the passage against exhaust of air therethrough. The inlet to the passage is capped by a filter 22.

The third device includes a passage 23 having a valve 24 backed by a spring 25. The valve 24 is connected to an armature 26 received in a solenoid 27. The relationship of the armature, solenoid and valve is such that when the solenoid is deenergized, the port 28 communicates with the control chamber 13, and when the solenoid is energized, the communication is cut off and when the solenoid is energized, the port is closed.

Figure 2:
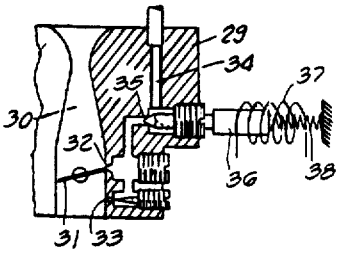
FIG. 2 is a fragmentary essentially diagrammatic view showing a portion of the carburetor disclosed in the aforementioned co-pending application, Ser. No. 309,744 and including a solenoid controlled shutoff valve.

Reference is now directed to FIG. 2, which indicates fragmentarily a mounting block 29 having a [rick] *rich* mixture supply duct 30. This construction is part of the carburetor more fully disclosed in the aforementioned copending application, Ser. No. 309,744. The supply duct 30 is provided with a throttle valve 31 and appropriate fuel supply ports 32 and 33 communicating between a fuel passage 34 and the duct 30. Interposed in the passage [74] *34* is a valve 35 connected to an armature 36 of a solenoid 37. A spring 38 normally closes the valve 35 whereas the solenoid when energized opens the valve.

Figure 3:
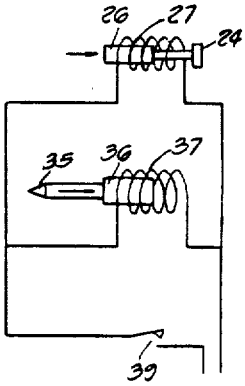
FIG. 3 is a diagrammatic view showing the electrical relationship between the solenoids shown in FIGS. 1 and 2 and an ignition switch.

As indicated in FIG. 3, the solenoids 27 and 37 are connected in parallel with an ignition switch 39 so that the two solenoids are energized when the switch is closed and deenergized when the switch is open.

The run-on prevention means is particularly adapted for use in connection with the engine disclosed in the co-pending application, Ser. No. 291,254, and in conjunction with the carburetor disclosed in Ser. No. 309,744, but may be adapted to other engines and their carburetors should a run-on condition exist. As more fully disclosed in the co-pending applications, a main fuel supply is introduced principally in the region of a venturi passage which is upstream from the portion of the duct 1 shown in FIG. 1, and also fuel may be introduced at the edge of the throttle valve 2. The resulting fuel air mixture is introduced into the respective cylinders of the engine. Also as disclosed in the copending applications, an enriched fuel mixture is established in the duct 30 by the introduction of fuel through the ports 32 and 33. The enriched mixture is introduced into each engine cylinder through a special prechamber device. The enriched mixture and the leaner mixture are intermixed in the main combustion chamber of each engine cylinder. The existence of the prechamber device may create a run-on action which will persist for a short period after the ignition key is turned off.

Operation of the run-on preventer shown in FIG. 1 is as follows: During normal operation, the ignition switch is closed causing the solenoid 27 to hold the valve 24 in its closed or broken line position shown in FIG. 1 so that the only openings available to the control chamber 13 are those provided by the passages 16 and 19. When the engine is in idling condition or near idling condition, the throttle valve is only partially open and the pin 14 is held in contact with the arm 5 of the control lever by means of the spring 15. If the throttle valve is opened causing the control chamber 13 to expand, air is permitted to enter relatively freely through the check valve 20. When the throttle valve moves toward its closed position causing the arm 5 to press against the pin 14 overcoming the spring 15, the rate of movement is dampened by the restriction 17 in the venting passage 16. The purpose of this is to provide a slight delay in the final closing movement of the throttle valve and to improve the quality of the engine exhaust emissions. As disclosed in the co-pending applications, additional means are provided for this purpose and are also connected to the throttle valve. However, these further refinements which do not relate to run-on prevention are omitted to simplify the illustration.

Run-on prevention is attained when the ignition switch 39 is turned off. In practice, when one is about to shut off the engine by turning off the ignition key, he first removes his foot from the accelerator pedal permitting the spring 7 to close the throttle valve. If the restricted venting passage 16 were the only means of air discharge from the control chamber 13 a delay would occur before final closure would be obtained. During this interval fuel would continue to go to the engine cylinders, and be ignited by any hot spot in a combustion chamber, thus causing the engine to continue to run. This is prevented by the solenoid 27 which, when deenergized, permits the spring 25 to open the valve 24 for free ingress and egress of air to and from the control chamber 13 so that actual closing of the throttle valve 2 is virtually instantaneous.

Referring to FIG. 2, if air-fuel mixture is permitted to enter the cylinders through the duct 30, a run-on condition will tend to occur. During operation of the engine, the solenoid 37 holds the valve 35 open permitting the flow of fuel to the duct 30. When the ignition is turned off the solenoid 37 is deenergized permitting the spring 38 to shut off the supply of fuel to the duct 30. As a result, this source of run-on is instantly closed when the ignition switch is turned off.

We claim:

1. A run-on preventing device for a fuel component duct of an internal combustion engine, the duct having a throttle valve, [a lever arm for controlling movement of the throttle valve,] a throttle control line for opening the throttle valve, *a lever arm for controlling movement of the throttle valve,* and a closing spring opposing the throttle control line to close the throttle valve, the run-on preventing device comprising: a housing means; a diaphragm dividing the housing means into a vented chamber and a control chamber; a pin extending between the diaphragm and the lever arm; a spring backing the diaphragm for maintaining the pin in contact with the lever arm; a restricted outlet from the control chamber tending to delay closing of the throttle valve in response to the closing spring; a check valve to admit air to the control chamber when the control chamber expands; a bleed valve; a spring *positioned within said control chamber* normally holding the bleed valve in its open position exposing the control chamber to atmospheric pressure; a solenoid control operable, when energized, to hold the bleed valve in its closed position, and operable, when de-energized, to permit the bleed valve spring to open the bleed valve; and an ignition switch having a closed position energizing the solenoid control to close the bleed valve in an off position de-energizing the solenoid control to open the bleed valve thereby to free the diaphragm for movement with the throttle valve to effect immediate closure in response to the closure spring.

2. A run-on preventing device as defined in claim 1, for an internal combustion engine having a fuel supply means, wherein: a normally closed valve means is provided for the fuel supply means; a solenoid actuator operable, when energized, to open the valve means, the solenoid actuator being connected with the ignition switch in parallel with the solenoid actuator to permit supply of fuel when the ignition switch is closed and to shut off the fuel supply when the ignition switch is opened.

3. For use with an internal combustion spark-ignition engine having an intake passage containing a throttle valve, a lever for operating the throttle valve, an actuator connected to the lever for opening the throttle valve and a *first* spring for closing the throttle valve, the improvement comprising, in combination: a dampener device for impeding closing movement of the throttle valve, said dampener device including a housing having a control chamber provided with a movable wall, means connected to the movable wall and positioned for actuation by said lever to impede movement of the lever in a direction corresponding to closing movement of the throttle valve, impeding of such movement being accomplished by change of pressure in the control chamber caused by movement of said movable wall, means providing a restricted passage connecting said control chamber to atmosphere, resilient means acting on said movable wall in a direction opposing closing movement of the throttle valve, a solenoid-operated valve for connecting the control chamber to atmosphere, and means for connecting the solenoid valve for actuation of the engine ignition switch whereby opening the ignition switch serves to connect the control chamber to atmosphere to permit rapid closing of the throttle valve[.], *second spring holding said solenoid operated valve open when said solenoid operated valve is not actuated, a venting passage communicating said control chamber to atmosphere, and check valve means in said venting passage preventing exhaust of said control chamber to atmosphere but allowing atmosphere to enter said exhaust chamber upon attainment of subatmospheric pressure therein when and as said resilient means produces movement of said movable wall and thereby causes enlargement of said control chamber.*

4. The combination set forth in claim 3 in which the means connected to the movable wall comprises an axially movable pin positioned to engage said lever arm.

5. [The combination set forth in claim 3 together with] *For use with an internal combustion spark-ignition engine having an intake passage containing a throttle valve, a lever for opening the throttle valve and a spring for closing the throttle valve, the improvement comprising, in combination: a dampener device for impeding closing movement of the throttle valve, said dampener device including a housing having a control chamber provided with a mov-*

*able wall, means connected to the movable wall and positioned for actuation by said lever to impede movement of the lever in a direction corresponding to closing movement of the throttle valve, impeding of such movement being accomplished by change of pressure in the control chamber caused by movement of said movable wall, means providing a restricted passage connecting said control chamber to atmosphere, resilient means acting on said movable wall in a direction opposing closing movement of the throttle valve, a solenoid-operated valve for connecting the control chamber to atmosphere, and means for connecting the solenoid valve for actuation by the engine ignition switch whereby opening the ignition switch serves to connect the control chamber to atmosphere to permit rapid closing of the throttle valve, a biasing means within said control chamber holding said solenoid-operated valve open when said solenoid-operated valve is not actuated,* a fuel supply conduit for the engine, a solenoid-operated valve for closing said conduit, and means for connecting the latter said solenoid-operated valve for actuation by the [engine] ignition switch.

6. The combination set forth in claim 3 in which said resilient means is positioned within said control chamber and wherein closing movement of the throttle valve acts to increase pressure in said control chamber.

7. For use with an internal combustion spark-ignition engine having an intake passage containing a throttle valve, a lever for operating said throttle valve, an actuator connected to the lever for opening the throttle valve and a spring for closing the throttle valve, the improvement comprising, in combination: a dampener device having means operated by said lever for impeding closing movement of the throttle valve, said dampener device having a control chamber of variable volume, means providing a restricted passage connecting said control chamber to atmosphere, a solenoid-operated valve for connecting the control chamber to atmosphere, and means for connecting the solenoid valve for actuation by the engine ignition switch whereby opening the ignition switch serves to connect the control chamber to atmosphere to disable the dampener device[.], *a biasing means within said control chamber holding said solenoid-operated valve open when said solenoid-operated valve is not actuated, a venting passage communicating said control chamber to atmosphere, and check valve means in said venting passage preventing exhaust of said control chamber to atmosphere but allowing atmosphere to enter said exhaust chamber upon attainment of subatmospheric pressure therein when and as said resilient means produces movement of said movable wall and thereby causes enlargement of said control chamber.*

8. For use with an internal combustion spark-ignition engine having an intake passage containing a throttle valve, a lever for operating said throttle valve, an actuator connected to the lever for opening the throttle valve and a spring for closing the throttle valve, the improvement comprising, in combination: a pneumatic dampener device having means operated by said lever for impeding closing movement of the throttle valve, said pneumatic dampener device having a control chamber of variable volume, a solenoid-operated valve for connecting the control chamber to atmosphere, and means for connecting the solenoid valve for actuation by the engine ignition switch whereby opening the ignition switch serves to connect the control chamber to atmosphere to disable the dampener device[.], *a biasing means within said control chamber holding said solenoid-operated valve open when said solenoid-operated valve is not actuated, a venting passage communicating said control chamber to atmosphere, and check valve means in said venting passage preventing exhaust of said control chamber to atmosphere but allowing atmosphere to enter said exhaust chamber upon attainment of subatmospheric pressure therein when and as said resilient means produces movement of said movable wall and thereby causes enlargement of said control chamber.*

9. For use with an internal combustion spark-ignition engine having an intake passage containing a throttle valve, a lever for operating said throttle valve, an actuator connected to the lever for opening the throttle valve and a spring for closing the throttle valve, the improvement comprising, in combination: a pneumatic dampener device having means operated by said lever for impeding closing movement of the throttle valve, said pneumatic dampener device having a control chamber of variable volume, electric means for venting the control chamber to atmosphere, and means for connecting said electric means for actuation by the engine ignition switch whereby opening the ignition switch serves to disable the dampener device[.], *a biasing means within said control chamber for venting said control chamber when said electric means is not actuated, a venting passage communicating said control chamber to atmosphere, and check valve means in said venting passage preventing exhaust of said control chamber to atmosphere but allowing atmosphere to enter said exhaust chamber upon attainment of subatmospheric pressure therein when and as said resilient means produces movement of said movable wall and thereby causes enlargement of said control chamber.*

* * * * *